(12) United States Patent
Andrade Costa et al.

(10) Patent No.: US 10,956,125 B2
(45) Date of Patent: *Mar. 23, 2021

(54) DATA SHUFFLING WITH HIERARCHICAL TUPLE SPACES

(71) Applicant: International Business Machines Corporation, Armonk, NY (US)

(72) Inventors: Carlos Henrique Andrade Costa, White Plains, NY (US); Abdullah Kayi, Elmsford, NY (US); Yoonho Park, Chappaqua, NY (US); Charles Johns, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 207 days.

This patent is subject to a terminal disclaimer.

(21) Appl. No.: 15/851,480

(22) Filed: Dec. 21, 2017

(65) Prior Publication Data

US 2019/0196783 A1 Jun. 27, 2019

(51) Int. Cl.
*G06F 7/08* (2006.01)
*G06F 12/0846* (2016.01)
*G06F 16/22* (2019.01)
*G06F 16/23* (2019.01)
*G06F 16/2455* (2019.01)

(52) U.S. Cl.
CPC ............ *G06F 7/08* (2013.01); *G06F 12/0848* (2013.01); *G06F 16/2228* (2019.01); *G06F 16/2372* (2019.01); *G06F 16/24554* (2019.01); *G06F 2212/282* (2013.01)

(58) Field of Classification Search
CPC ........................................................ G06F 7/08
See application file for complete search history.

(56) References Cited

U.S. PATENT DOCUMENTS

| 5,692,193 | A | 11/1997 | Jagannathan et al. |
| 9,240,955 | B1 | 1/2016 | Mukhopadhyay et al. |
| 9,424,274 | B2 | 8/2016 | Cramer et al. |

(Continued)

FOREIGN PATENT DOCUMENTS

WO 2017086987 A1 5/2017

OTHER PUBLICATIONS

List of IBM Patents or Patent Applications Treated as Related.

(Continued)

*Primary Examiner* — Dawaune A Conyers
(74) *Attorney, Agent, or Firm* — Scully, Scott, Murphy & Presser, P.C.; Daniel P. Morris

(57) ABSTRACT

Methods and systems for shuffling data are described. A processor may generate pair data from source data. The processor may insert the pair data into local tuple spaces. In response to a request for a particular key, the processor may determine a presence of the requested key in a global tuple space. The processor may, in response to a presence of the requested key in the global tuple space, update the global tuple space. The update may be based on the pair data among the local tuple spaces including the existing key. The processor may, in response to an absence of the requested key in the global tuple space, insert pair data including the missing key from the local tuple spaces into the global tuple space. The processor may fetch the requested pair data, and may shuffle the fetched data to generate a dataset.

20 Claims, 5 Drawing Sheets

(56) References Cited

U.S. PATENT DOCUMENTS

| | | |
|---|---|---|
| 10,152,323 B2 | 12/2018 | Roussel et al. |
| 2004/0162827 A1 | 8/2004 | Nakano |
| 2006/0271528 A1 | 11/2006 | Gorelik |
| 2011/0029759 A1 | 2/2011 | Macy et al. |
| 2013/0345999 A1 | 12/2013 | Hafen et al. |
| 2014/0059552 A1 | 2/2014 | Cunningham et al. |
| 2014/0075161 A1 | 3/2014 | Zhang et al. |
| 2014/0372438 A1 | 12/2014 | Chandramouli et al. |
| 2015/0150017 A1 | 5/2015 | Hu et al. |
| 2015/0261804 A1 | 9/2015 | Vemuri et al. |
| 2015/0331724 A1 | 11/2015 | Sahu |
| 2016/0034205 A1 | 2/2016 | Mehra et al. |
| 2016/0042039 A1* | 2/2016 | Kaufmann .......... G06F 16/2456 707/722 |
| 2019/0109793 A1* | 4/2019 | Dalal .................. H04L 47/2441 |
| 2019/0196783 A1 | 6/2019 | Andrade Costa et al. |

OTHER PUBLICATIONS

Office Action dated Nov. 15, 2019 received in U.S. Appl. No. 15/851,511.
Notice of Allowance dated May 27, 2020 received in U.S. Appl. No. 15/851,511.

\* cited by examiner

DATA SHUFFLING WITH HIERARCHICAL TUPLE SPACES

This invention was made with government support under Contract No. DE-AC02-05CH11231, Subcontract No. 6940385 awarded by the Department of Energy. The government has certain rights to this invention.

FIELD

The present application relates generally to computers, and computer applications, and more particularly to computer-implemented methods and systems data management systems.

BACKGROUND

In data management systems, data shuffling is often used as a building block for various operations on data (e.g. sort, reduce, group), and is widely used in big data frameworks (e.g., Spark, MapReduce, Hadoop etc.). In some examples, data shuffling may be associated with the repartitioning and aggregation of data in an all-to-all operations.

SUMMARY

In some examples, methods for shuffling source data to generate a dataset are generally described. The methods include generating, by a first map module of a processor, first pair data from the source data. The methods may further include generating, by a second map module of the processor, second pair data from the source data. Each pair data among the first pair data and the second pair data may include a key and a value associated with the key. The methods may further include inserting, by the first map module of the processor, a first portion of the first pair data into a first local tuple space accessible by the first map module. The inserted first portion of the first pair data may include keys that are absent from the first local tuple space prior to the insertion of the first portion of the first pair data. The methods may further include updating, by the first map module of the processor, the first local tuple space based on a second portion of the first pair data. The second portion of the first pair data may include keys that are present in the first local tuple space prior to the update of the first local tuple space. The methods may further include inserting, by the second map module of the processor, a first portion of the second pair data into a second local tuple space accessible by the second map module. The inserted first portion of the second pair data may include keys that are absent from the second local tuple space prior to the insertion of the first portion of the second pair data. The methods may further include updating, by the second map module of the processor, the second local tuple space based on a second portion of the second pair data. The second portion of the second pair data may include keys that are present in the second local tuple space prior to the update of the second local tuple space. The methods may further include activating, by the processor, a shuffle module of the processor to execute a shuffle operation on pair data that includes a particular key. The methods may further include, determining, by the processor, and upon activation of the shuffle module, a presence of one or more keys in a global tuple space accessible by the first map module and the second map module. In response to a presence of an existing key in the global tuple space, the methods may further include updating, by the processor, pair data in the global tuple space that includes the existing key. The update may be based on pair data among the first and second local tuple spaces that includes the existing key. In response to an absence of a missing key in the global tuple space, the methods may further include inserting, by the processor, pair data including the missing key among the first and second local tuple space into the global tuple space. The methods may further include identifying, by the shuffle module of the processor, pair data in the global tuple space that includes the particular key. The methods may further include fetching, by the shuffle module of the processor, the identified pair data from a memory. The fetched pair data may include the particular key and one or more values associated with the particular key. The methods may further include executing, by the shuffle module of the processor, the shuffle operation on the fetched pair data to generate the dataset.

In some examples, systems effective to shuffle source data to generate a dataset are generally described. The systems may include a memory configured to store the source data. The systems may further include a processor configured to be in communication with the memory. The systems may further include at least a first map module and a second map module configured to be in communication with the memory and the processor. The systems may further include at least one shuffle module configured to be in communication with the memory and the processor. The first map module may be configured to generate first pair data from the source data. The first map module may be further configured to insert a first portion of the first pair data into a first local tuple space accessible by the first map module. The inserted first portion of the first pair data may include keys that are absent from the first local tuple space prior to the insertion of the first portion of the first pair data. The first map module may be further configured to update the first local tuple space based on a second portion of the first pair data. The second portion of the first pair data may include keys that are present in the first local tuple space prior to the update of the first local tuple space. The second map module may be configured to generate second pair data from the source data. The second map module may be configured to insert a first portion of the second pair data into a second local tuple space accessible by the second map module. The inserted first portion of the second pair data may include keys that are absent from the second local tuple space prior to the insertion of the first portion of the second pair data. The second map module may be further configured to update the second local tuple space based on a second portion of the second pair data. The second portion of the second pair data may include keys that are present in the second local tuple space prior to the update of the second local tuple space. The processor may be configured to activate the shuffle module to execute a shuffle operation on pair data that includes a particular key. The processor may be further configured to determine a presence of one or more keys in a global tuple space accessible by the first map module and the second map module. In response to a presence of an existing key in the global tuple space, the processor may be further configured to update pair data in the global tuple space that includes the existing key. The update may be based on pair data among the first and second local tuple spaces that includes the existing key. In response to an absence of a missing key in the global tuple space, the processor may be further configured to insert pair data including the missing key among the first and second local tuple space into the global tuple space. The shuffle module may be further configured to identify a pair data in the global tuple space that includes the particular key. The shuffle module may be further configured to fetch the identified pair data from the memory. The fetched pair data may include the particular key and one or more aggregated values associated with the particular key. The shuffle module may be further configured to execute the shuffle operation on the fetched pair data to generate the dataset.

In some examples, computer program products for aggregating source data to generate a dataset are generally described. The computer program products may include a computer readable storage medium having program instructions embodied therewith. The program instructions may be executable by a device to cause the device to generate first pair data from the source data. The program instructions may be further executable by the device to cause the device to generate second pair data from the source data. Each pair data among the first pair data and the second pair data may include a key and a value associated with the key. The program instructions may be further executable by the device to cause the device to insert a first portion of the first pair data into a first local tuple space accessible by a first map module. The inserted first portion of the first pair data may include keys that are absent from the first local tuple space prior to the insertion of the first portion of the first pair data. The program instructions may be further executable by the device to cause the device to update the first local tuple space based on a second portion of the first pair data. The second portion of the first pair data may include keys that are present in the first local tuple space prior to the update of the first local tuple space. The program instructions may be further executable by the device to cause the device to insert a first portion of the second pair data into a second local tuple space accessible by a second map module. The inserted first portion of the second pair data may include keys that are absent from the second local tuple space prior to the insertion of the first portion of the second pair data. The program instructions may be further executable by the device to cause the device to update the second local tuple space based on a second portion of the second pair data. The second portion of the second pair data may include keys that are present in the second local tuple space prior to the update of the second local tuple space. The program instructions may be further executable by the device to cause the device to activate a shuffle phase to execute a shuffle operation on pair data that includes a particular key. The program instructions may be further executable by the device to cause the device to determine a presence of one or more keys in a global tuple space accessible by the first map module and the second map module. In response to a presence of an existing key in the global tuple space, the program instructions may be further executable by the device to cause the device to update pair data in the global tuple space that includes the existing key. The update may be based on pair data among the first and second local tuple space that includes the existing key. In response to an absence of a missing key in the global tuple space, The program instructions may be further executable by the device to cause the device to insert pair data including the missing key among the first and second local tuple space into the global tuple space. The program instructions may be further executable by the device to cause the device to identify pair data in the global tuple space that includes the particular key. The program instructions may be further executable by the device to cause the device to fetch the identified pair data from a memory. The fetched pair data may include the particular key and one or more values associated with the particular key. The program instructions may be further executable by the device to cause the device to execute the shuffle operation on the fetched pair data to generate the dataset.

DETAILED DESCRIPTION

Briefly stated, methods and systems for shuffling data are described. A processor may generate pair data from source data. The processor may insert the pair data into local tuple spaces. In response to a request for a particular key, the processor may determine a presence of the requested key in a global tuple space. The processor may, in response to a presence of the requested key in the global tuple space, update the global tuple space. The update may be based on the pair data among the local tuple spaces including the existing key. The processor may, in response to an absence of the requested key in the global tuple space, insert pair data including the missing key from the local tuple spaces into the global tuple space. The processor may fetch the requested pair data, and may shuffle the fetched data to generate a dataset.

Figure 1:
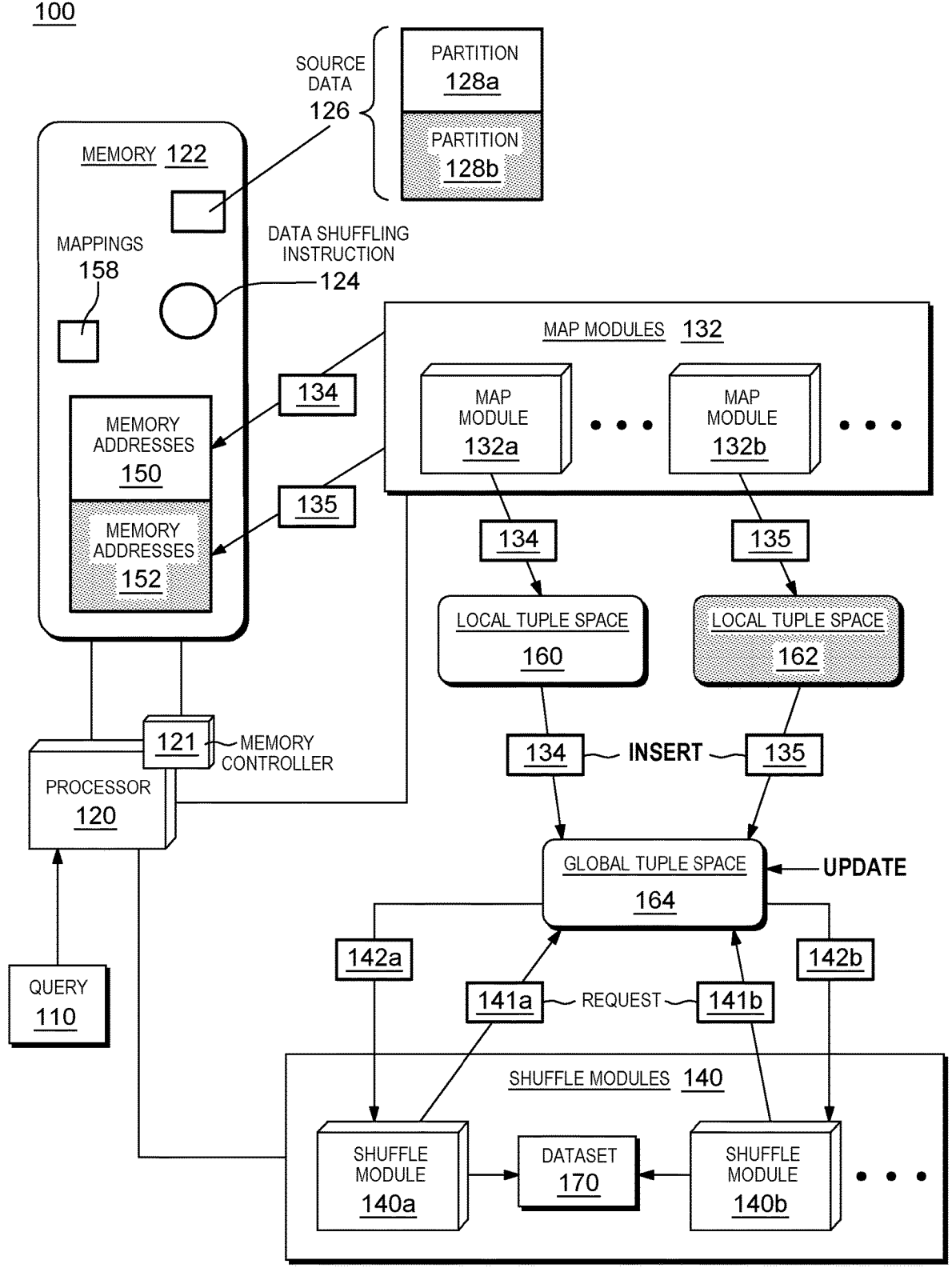
FIG. 1 illustrates an example computer system that can be utilized to implement data shuffling with hierarchical tuple spaces.

FIG. 1 illustrates an example computer system 100 that can be utilized to implement data shuffling with hierarchical tuple spaces, arranged in accordance with at least some embodiments described herein. In some examples, system 100 may be a computer system, and may include a processor 120, a memory controller 121, a memory 122, one or more map modules 132 (including map modules 132a, 132b, etc.), and one or more shuffle modules 140 (including shuffle modules 140a, 140b, etc.). Processor 120, memory controller 121, memory 122, map modules 132, and shuffle modules 140 may be configured to be in communication with each other. In some examples, processor 120, memory controller 121, memory 122, map modules 132, and shuffle modules 140 may be housed, or distributed, in a same housing and/or a computer device. In some examples, processor 120, memory controller 121, memory 122, and map modules 132, and shuffle modules 140 may be housed, or distributed, in two or more different housings and/or computer devices. For example, processor 120, memory controller 121 and memory 122 may be distributed in a first device and map modules 132, and shuffle modules 140 may be distributed in a second device different from the first device. In some examples, more than two map modules and more than two shuffle modules, may be included in system 100 depending on a desired implementation. For example, system 100 may be designed to optimize shuffle operations between two or more shuffle modules such that a distributed nature of data shuffling on multiple computing nodes may be captured, and multiple instances of the shuffle modules may exist simultaneously.

In another embodiment, processor 120, memory controller 121, memory 122, and map modules 133, and shuffle modules 140 may each be hardware components or hardware modules of system 100. In some examples, map modules 132, and shuffle modules 140 may each be a hardware component, or hardware modules, of processor 120. In some examples, processor 120 may be a central processing unit of a computer device. In some examples, processor 120 may control operations of map modules 132, and shuffle modules 140. In some examples, each map modules 132 and shuffle modules 140 may each include electronic components, such as integrated circuits. In some examples, each map module 132 and each shuffle module 140 may be software modules that may be implemented with processor 120, or may be software modules that may be implemented with processor 120 to execute respective threads (e.g., map threads, reduce threads, shuffle threads, etc.). In some examples, processor 120 may be configured to control operations of memory controller 121. In some examples, processor 120 may be configured to run an operating system that includes instructions to manage map modules 132, and shuffle modules 140 and memory 122. In some examples, memory controller 121 may be integrated as a chip on processor 120. Memory controller 121 may be configured to manage a flow of data to and from memory 122.

Memory 122 may be configured to store a data shuffling instruction 124. Data shuffling instruction 124 may include one or more set of instructions to facilitate implementation of system 100. In some examples, data shuffling instruction 124 may include instructions executable by an operating system running on processor 120 to manage virtual memory operations and mappings between virtual memory and memory 122. In some examples, data shuffling instructions 124 may be implemented using other methods, such as being implemented in runtime feature, and may be accessed via application programming interface (API) calls. In some examples, memory 122 may be a main memory of a device configured to implement system 100. In some examples, memory 122 may include persistent storage components, or may include dynamic random access memory (DRAM) components.

In an example, system 100 may receive a query 110 indicating an inquiry to process data stored in memory 122 to generate a dataset 170. Generation of dataset 170 may include reorganizing, sorting, grouping, filtering, joining, word counting, etc. based on an index or key of each piece of data among source data 126. For example, query 110 may inquire a number of occurrences of each unique word among source data 126 stored in memory 122. System 100 may be implemented to generate a dataset 170, where dataset 170 may be a piece of data including a response to query 110. In an example associated with word counting, dataset 170 may include data indicating a number of occurrence for each unique word among source data 126. In an example associated with grouping, dataset 170 may include one or more groups of data, where each group may correspond to a respective key.

In another example, query 110 may indicate an inquiry to generate dataset 170 including information of a plurality, and/or a significantly large amount, of different users (e.g., one million, two million, etc.) of a set of social network platforms. Each key may be an identification of a user, such as a username, a name, an ID number, etc. A particular user may have provided a name on a first and second social network platforms, but may have provided an age on the first social network platform and a location on a second social network platform. System 100 may be implemented to combine the information of the particular user such that the generated dataset 170 may include key-value data indicating the name of the particular user, and also the age and location of the particular user, as one piece of data.

Processor 120 may partition source data 126 into one or more partitions, such as partitions 128a, 128b. In an example, source data 126 may be a database including a significantly large amount of data, and each partition may correspond to a portion of the database such as a number of rows. Processor 120 may activate a map phase of the implementation of system 100, such as by activating one or more map modules 132. Processor 120 may assign a map module to generate pair data, or a set of key-value pairs, for each partition. For example, processor 120 may assign map module 132a to generate pair data 134 from partition 128a, and may assign map module 132b to generate pair data 135 from partition 128b. As will be described in more detail below, pair data 134, 135 may each include one or more key-value pairs, and each key-value pair may include a key and a value associated with the key. For example, if query 110 is an inquiry regarding a number of occurrences of words, a key may be a word and a value may be a number of occurrence of the word, or may be a value to indicate a singular presence of the word (e.g., "1" being present). Each map module may store respective generated pair data in memory 122 at a respective set of memory addresses. For example, map module 132a may store the generated pair data 134 in memory 122 at memory addresses 150, and map module 132b may store the generated pair data 135 in memory 122 at memory addresses 152. Memory 122 may include one or more different sets of memory addresses assigned, or allocated to, different map modules. For example, memory addresses 150 may be assigned to map module 132a and memory addresses 152 may be assigned to map module 132b. In another example, processor 120 may generate pair data 134, 135 and may send pair data 134, 135 to respective map modules 132a, 132b for subsequent processing.

Processor 120 may, for example, run an operating system to create virtual memory spaces, such as a local tuple space 160, a local tuple space 162, and a global tuple space 164. Local tuple space 160 may be assigned to map module 132a and local tuple space 162 may be assigned to map module 132b. In some examples, an example tuple space may be associated with a concept of a computation environment implementing an associative memory model for distributed/parallel programming. Tuple spaces may also be associated with fundamental mechanisms of various programming languages.

In an example, local tuple space 160 may be assigned to map module 132a such that other map modules (e.g., map modules 132b), may not have access to local tuple space 160. In an example, when map module 132b does not have access to local tuple space 160, map module 132b may fail to determine a storage location of pair data 134 generated and/or stored by map module 132a. Similarly, local tuple space 162 may be assigned to map module 132b and may be inaccessible by map module 132a.

In an example, map modules 132 may each insert respective generated pair data into an assigned local tuple space. For example, map module 132a may insert pair data 134 into local tuple space 160 and map module 132b may insert pair data 134 into location tuple space 162. Insertion of a piece of pair data into a local tuple space may include populating an entry of the local tuple space with an indication, or identification, of the piece of pair data. As a result of inserting each piece of key-value pair among pair data 134, 135, into local tuple spaces 160, 162, each local tuple space may include one or more key-value pairs that correspond to each key. As described below, in addition to insertion of key-value pairs into local and/or global tuple spaces, locations among local and/or global tuple spaces may be updated, such as by updating content stored in a corresponding, or mapped, memory address, based on a function inquired by query 110.

In another example, map modules 132 may each insert pair data into an assigned local tuple space, where a key of the inserted pair data may be absent from the assigned local tuple space prior to the insertion. For example, map module 132a may determine that a particular key is missing in local tuple space 160 and, in response, may insert a key-value pair with the missing key among pair data 134 into local tuple space 160. Map modules 132 may also update respective assigned local tuple space when a key is present in the assigned local tuple space. For example, map module 132a may determine that a particular key is present in local tuple space 160 and, in response, may insert a key-value pair with the existing key among pair data 134 into local tuple space 160. As a result of inserting and/or updating key-value pairs in local tuple spaces 160, 162, each local tuple space may include a set of key-value pairs and each key-value pair may correspond to a particular key. Processor 120 may further store pair data that has been inserted and/or updated in local tuple spaces 160, 162, in memory 122 at memory addresses 150, 152, respectively.

Processor 120 may map memory addresses 150, 152 of memory 122 to one or more locations, or entries of local tuple spaces 160, 162 based on the insertion and/or update of pair data 134, 135 in local tuple spaces 160, 162. For example, processor 120 may map a memory address storing pair data 134 to an entry, or a location, among local tuple space 160, and may generate one or more page tables, such as mappings 158, to indicate the mappings between memory addresses 150, 152 of memory 122 and local tuple spaces 160, 162. Processor 120 may store mappings 158 in memory 122.

In an example, data shuffling instructions 124 may include instructions indicating a need to activate a shuffle phase of an implementation of system 100 subsequent to a map phase of the implementation (e.g., generation of pair data and insertion of pair data into local tuple spaces). A shuffle phase may correspond to, for example, a shuffle phase in a mapreduce framework, a key-based sorting phase, a key-based grouping phase, etc. Thus, upon a completion of generating pair data 134, 135, and mapping memory addresses of memory 122 to local tuple spaces, processor 120 may activate one or more shuffle modules 140 to execute data shuffling operations (e.g., aggregate, sort, filter, group, etc.) in order to generate dataset 170. For example, processor 120 may activate shuffle module 140a to aggregate pair data including a first key, and may activate shuffle module 140b to aggregate pair data that includes a second key (further described below). In some examples, processor 120 may activate shuffle modules 140 to sort, join, group, organize, pair data based on one or more keys. Shuffle modules 140 may be configured to execute key-based shuffle operations associated with data shuffling such as sorting, joining, grouping, etc. pair data based on one or more keys of the pair data.

Upon the activation of shuffle modules 140a, 140b, each shuffle module 140 may request a particular key from the global tuple space, such as by communicating with memory controller 121 and/or processor 120 to identify memory addresses storing pair data that includes particular keys. For example, shuffle module 140a may generate a request 141a for pair data including a first key, and shuffle module 140b may generate a request 141b for pair data including a second key. In response to activation of shuffle modules 140a, 140b, and/or in response to requests 141a, 141b, processor 120 may update global tuple space 164, where global tuple space 164 may be accessible by all map modules including map modules 132a, 132b. In an example, processor 120 may update global tuple space 164 by inserting pair data including keys that are absent from global tuple space 164, and may update pair data within global tuple space 164 that includes keys present in global tuple space 164 prior to the update. Insertion of a piece of pair data into global tuple space 164 may include populating an entry of the global tuple space with an indication, or identification, of the piece of pair data (further described below). In some examples, processor 120 may append metadata to a key of each pair data prior to inserting the pair data into global tuple space 164 (further described below). Processor 120 may map memory addresses 150, 152 of memory 122 that stored pair data 134, 135 to entries, or locations, of global tuple space 164. Processor 120 may update mappings 158 to include mappings between memory 122 and global tuple space 164.

In an example, in response to requests 141a, 141b, processor 120 may insert pair data into global tuple space 164, or may update global tuple space 164, based on whether each key is present or absent in global tuple space 164. Processor 120 may insert pair data including a key that may be absent from global tuple space 164, and may update pair data that is already inserted in global tuple space 164 when a key is present in global tuple space 164. As a result of inserting and/or updating key-value pairs in global tuple space 164, global tuple space 164 may include a set of key-value pairs, where each key-value pair correspond to a particular key. Processor 120 may further update memory addresses 150, 152 of memory 122 storing pair data that has been updated in global tuple space 164.

Upon inserting and/or updating pair data 134, 135 into global tuple space 164, shuffle module 140a may identify pair data 142a in global tuple space 164, where pair tuple 142a may include a key-value pair including the first key requested by shuffle module 140a. Shuffle module 140a, based on mappings 158, may identify a memory address among memory addresses 150 of memory 122 that stored pair data 142a. Shuffle module 140a may fetch pair data 142a from the identified memory address.

Similarly, shuffle module 140b may identify pair data 142b in global tuple space 164, where pair tuple 142b may include key-value pairs including the second key requested by shuffle module 140b. Shuffle module 140b, based on mappings 158, may identify a memory address among memory addresses 152 of memory 122 that stored pair data 142b. Shuffle module 140b may fetch pair data 142b from the identified memory address.

Processor 120 may combine pair data 142a, 142b fetched by shuffle modules 140a, 140b, and pair data fetched by other shuffle modules 140, to generate dataset 170. As a result, dataset 170 may be include a plurality of key-value pairs, where each key-value pair includes a key, and includes one or more values associated with the corresponding key (further described below).

Figure 2:
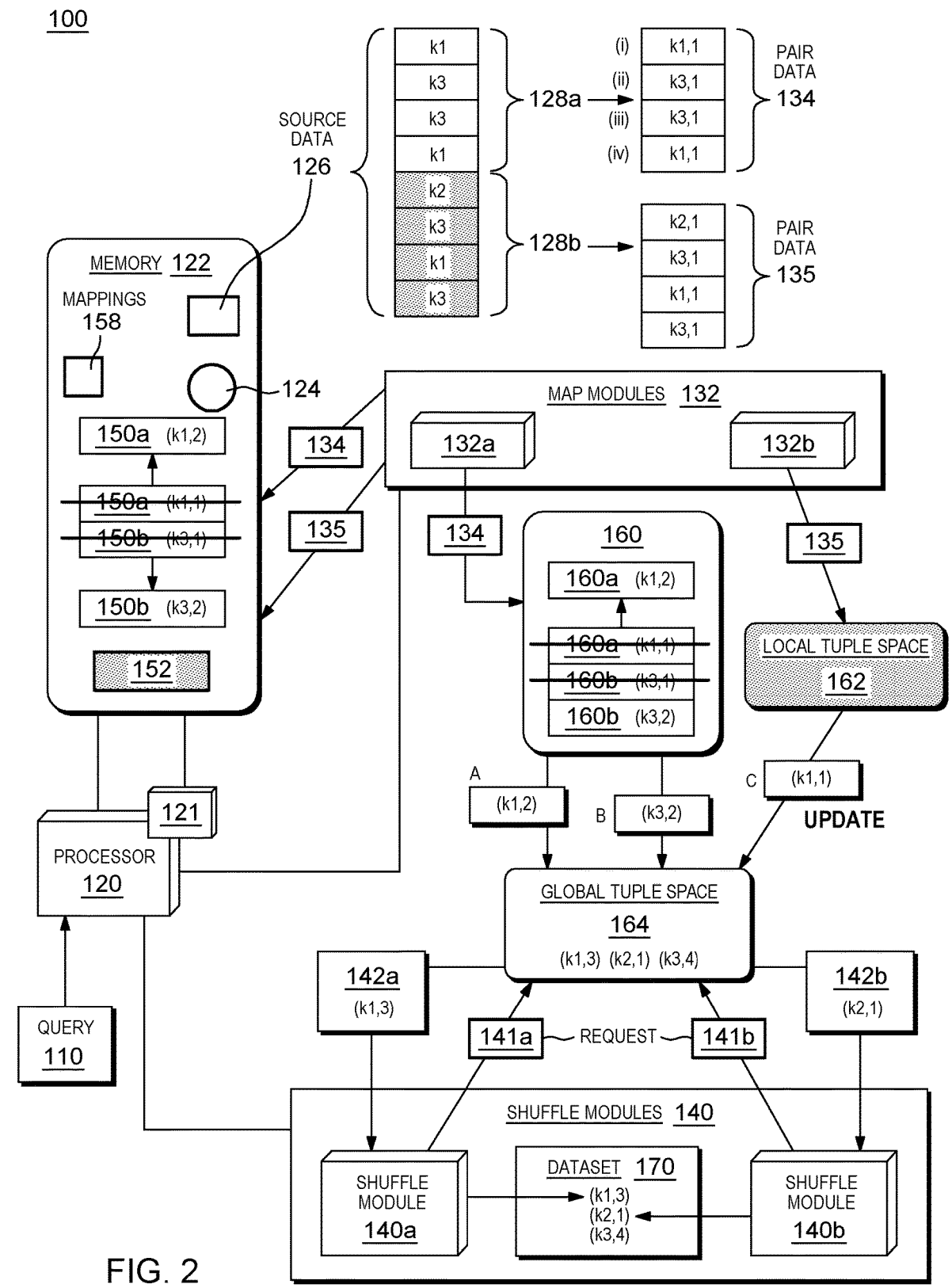
FIG. 2 illustrates the example system of FIG. 1 with additional details relating to data shuffling with hierarchical tuple spaces.

FIG. 2 illustrates the example system of FIG. 1 with additional details relating to data shuffling with hierarchical tuple spaces, arranged in accordance with at least some embodiments described herein. FIG. 2 is substantially similar to computer system 100 of FIG. 1, with additional details.

Those components in FIG. 2 that are labeled identically to components of FIG. 1 will not be described again for the purposes of clarity.

In an example shown in FIG. 2, system 100 may receive a query 110 indicating an inquiry to count a number of occurrences of each unique word among source data 126 stored in memory 122. Source data 126 may include one or more occurrences of words "k1", "k2", "k3". Processor 120 may partition source data 126 into partitions 128a, 128b, where partition 128a includes words "k1", "k3", "k3", "k1", and partition 128b includes words "k2", "k3", "k1", "k3". Processor 120 may assign map module 132a to generate pair data 134 from partition 128a, and may assign map module 132b to generate pair data 135 from partition 128b.

In an example, map module 132a may convert each word among partition 128a into a key-value pair, such as by counting an occurrence of each word. As shown in the example, a key-value pair (k1, 1) may represent a singular occurrence of the word "k1". In the example, pair data 134 generated from partition 128a may include key-value pairs (k1, 1), (k3, 1), (k3,1), (k1, 1). Map module 132a may store pair data 134 in memory 122 at a set of memory addresses 150a, 150b, 150c, 150d. Similarly, pair data 135 generated from partition 128b may include key-value pairs (k2, 1), (k3, 1), (k1,1), (k3, 1). Map module 132b may store pair data 135 in memory 122 at a set of memory addresses 152.

Map module 132a may insert pair data 134 into local tuple space 160, and/or may update local tuple space 160 based on pair data 134, where local tuple space 160 may be accessible by map module 132a and may be inaccessible by map module 132b. In some examples, prior to each insertion, map modules 132a, 132b may determine whether a key among pair data 134, 135, is present or absent in respective local tuple spaces 160, 162. Based on the presence and/or absence, map modules 132 may determine whether to insert a piece of pair data into respective local tuple space, or to update existing pair data in respective local tuple space. As map modules 132 update existing pair data in local tuple spaces, processor 120 may update contents stored in memory addresses 150, 152 of memory 122 based on the updated pair data among the local tuple spaces. Similarly, map module 132b may insert and/or update pair data 135 into local tuple space 162, where local tuple space 162 may be accessible by map module 132b and may be inaccessible by map module 132a.

In the example shown in FIG. 2, pair data 134 may include at least four pieces of key-value pairs (labeled as (i), (ii), (iii), and (iv)). Map module 132a may insert an indication of each piece key-value pair of pair data 134 into locations of local tuple space 160. For example, map module 132a may insert the key-value pair labeled as (i), or (k1,1), into location 160a of local tuple space 160, where key "k1" is absent from local tuple space 160 prior to the insertion. Similarly, map module 132a may insert the key-value pair labeled as (ii), or (k3,1), into location 160b of local tuple space 160, where key "k3" is absent from local tuple space 160 prior to the insertion. Subsequently, map module 132a may determine that key "k3" is present in local tuple space 160 and, in response, may update the content (k3,1) in location 160b of local tuple space 160 using the key-value pair labeled as (iii), or (k3,1). Since query 110, in the example shown, relates to counting, map module 132a may sum the values indicated in (k3,1) and (k3,1) to generate new key-value data (k3,2). Similarly, map module 132a may determine that key "k1" is present in local tuple space 160 and, in response, may update the content (k1,1) in location 160a of local tuple space 160 using the key-value pair labeled as (iv), or (k1,1), to generate new key-value data (k1,2). Map module 132a may further update data stored in memory addresses 150 of memory 122 based on the updates to local tuple space 160. Map module 132b may further update data stored in memory addresses 152 of memory 122 based on the updates to local tuple space 162.

Upon storing pair data 134, 135 in memory 122, and inserting/updating pair data 134, 135 in local tuple spaces 160, 162, processor 120 may map memory addresses 150 to one or more locations of local tuple space 160. In the example shown in FIG. 2, memory address 150a may be mapped to location 160a of local tuple space 160 (based on (k1,2) being stored at memory address 150a and inserted in location 160a), and memory address 150b may be mapped to location 160b of local tuple space 160 (based on (k3,2) being stored at memory address 150b and inserted in location 160b). A selection of mapping locations to map memory addresses 150 may be performed by processor 120, or by an operating system being executed by processor 120, or memory controller 121, based on various memory management algorithms. In response to mapping memory addresses 150 to local tuple space 160, processor 120 may update mappings 158 stored in memory 122.

Processor 120 may activate and assign one or more shuffle modules 140 to execute shuffle operations, such as aggregation, sort, combine, etc., pair data based on a same key. For example, if the query 110 received at system 100 relates to word counting, processor 120 may assign a set of shuffle modules to count words, where each shuffle module may be responsible to count one particular word. In the example, processor 120 may assign shuffle module 140a to determine a number of occurrences of word "k1" among source data 126, and may assign shuffle module 140b to determine a number of occurrences of word "k2" among source data 126.

Shuffle module 140a may generate a request 141a for pair data including word "k1", and shuffle module 140b may generate a request 141a for pair data including word "k2". In response to requests 141a, 141b, processor 120 may determine whether a key among pair data 134, 135, is present or absent in global tuple space 164. Based on the presence and/or absence of keys in global tuple space 165, processor 120 may determine whether to insert a piece of pair data into global tuple space 164, or to update an existing pair data in global tuple space 164.

Focusing on local tuple space 160 as an example, in an operation "A", processor 120 may determine whether to insert key-value pair (k1,2), which may be stored in memory address 150a, into global tuple space 164. Processor 120 may determine that key "k1" may be absent in global tuple space 164 and, in response, may insert (k1,2) into global tuple space 164. In a subsequent operation "B", processor 120 may determine whether to insert key-value pair (k3,2), which may be stored in memory address 150b, into global tuple space 164. Processor 120 may determine that key "k3" may be absent in global tuple space 164 and, in response, may insert (k3,2) into global tuple space 164.

In a subsequent operation "C", processor 120 may determine whether to insert key-value pair (k1,1) from local tuple space 162 into global tuple space 164. Processor 120 may determine that key "k1" may be present in global tuple space 164 (based on the previously inserted (k1,2) from local tuple space 160) and, in response, may update (k1,2) that is present in global tuple space 164. Based on query 110 being related to word counting, processor 120 may sum values between the two key-value pairs (k1,2) and (k1,2) to generate (k1,3) in global tuple space 164. In an example with information consolidation from social network platforms, processor 120 may update pair data by appending additional values into the pair data, such as by adding a second value to a corresponding key in order to generate a new tuple including one key and two values. Processor 120 may further update pair data stored in memory 122 based on the update to global tuple space 164.

In some examples, execution of the shuffle phase may begin prior to a completion of the map phase. For example, one or more shuffle modules 140 may begin to fetch pair data from global tuple space 164 prior to a completion of insertion and/or update of data in global tuple space 164. In an example, after operation "A" shown in FIG. 2, the key-value pair (k1,2) may be present in global tuple space 164. Shuffle module 140a may execute an API call to fetch (k1,2) from global tuple space 164 prior to operation "C", and remove (k1,2) from global tuple space 164. As a result, operation "C" may become an insertion operation because key "k1" may be absent from global tuple space 164 after the fetch/remove operation by shuffle module 140a. In another example, after operation "A" shown in FIG. 2, the key-value pair (k1,2) may be present in global tuple space 164. Shuffle module 140a may execute an API call to copy (k1,2) from global tuple space 164 prior to operation "C", such that (k1,2) may remain in global tuple space 164. As a result, operation "C" may remain as an update operation because key "k1" is present in global tuple space 164 after the copy operation by shuffle module 140a. Subsequently, shuffle module 140a may fetch or copy (k1,3) and may replace (k1,2) in dataset 170 with the newly fetched (k1,3).

In the example shown in FIG. 2, upon a completion of insertion and update to global tuple space 164, global tuple space 164 may include one key-value pair for each key among source data 126. Processor 120 may map memory addresses that stored updated key-value pairs to locations of global tuple space 164. Processor 120 may update mappings 158 to include mappings between memory 122 and global tuple space 164.

In some examples, global keys may be generated by appending metadata to each pieces of pair data, such that insertion of the pair data into global tuple space 164 includes insertion of pair data including the global keys. For example, processor 120 may append an indicator to each key among pair data 134, where the indicator may indicate locality information such as an identification of a processor/node/executor (e.g., map module 132a, or a process configured to run a map tasks), an identification of partition 128a, and a memory address storing the pair data with the appended metadata. In some examples, global keys may be generated by appending metadata to each pieces of pair data, such that insertion of the pair data into global tuple space 164 includes insertion of pair data including the global keys.

In some examples, upon inserting and/or updating pair data 134, 135 in global tuple space 164, shuffle module 140a may identify pair data 142a (k1,3) in global tuple space 164. Shuffle module 140a, based on mappings 158, may identify a memory address of memory 122 that stored pair data 142a. Shuffle module 140a may fetch pair data 142a from the identified memory address. Similarly, shuffle module 140b may identify pair data 142b (k2, 1) in global tuple space 164. Shuffle module 140b, based on mappings 158, may identify a memory address of memory 122 that stored pair data 142b. Shuffle module 140b may fetch pair data 142b from the identified memory address. In some examples, shuffle modules 140 may fetch pair data from global tuple space 164 prior to a completion of updates to pair data inserted into global tuple space. For example, a shuffle module assigned to request "k3" may fetch (k3,2) from global tuple space after an update to global tuple space 164 based on pair data 134, while processor 120 may still be updating global tuple space based on pair data 135. Upon a completion of updating global tuple space 164 based on pair data 135, the shuffle module may fetch (k3,4) from global tuple space 164. In some examples, the fetching operations by shuffle modules 140a, 140b, may be performed in parallel. In some examples, by updating global tuple space 164 during a shuffle phase (and in some examples, prior to a reduce phase), an amount of computation being perform by system 100 (or by shuffle modules 140) may be reduced. In some examples, global tuple space 164 may be distributed and thus, tuples, or key-value pairs within global tuple space 164 may not be local to a processing node of a shuffle module. By updating the key-value pairs, that may not be local to a shuffle module, within global tuple space 164 prior to a fetch operation, an amount of computation and/or operations to be performed by the shuffle module may be reduced. In some examples, global tuple space 164 may be local to one or more shuffle modules. As such, updating key-value pair data within global tuple space 164 during a shuffle phase may reduce an amount of computation, and may improve an efficiency of shuffling a significant amount of source data to generate different datasets.

Processor 120 may combine the pair data generated by shuffle module 142a, shuffle module 142b, and/or additional shuffle modules (e.g., another shuffle module may generate (k3,4)), to complete a generation of dataset 170. As a result, dataset 170 may be include a plurality of key-value pairs, where each key-value pair includes a key, and includes one or more aggregated values associated with the corresponding key. As shown in the example, dataset 170 may include key-value pairs (k1,3), (k2,1), and (k3,4) to indicate that there are three occurrences of "k1", one occurrence of "k2", and four occurrences of "k3", in source data 126. Processor 120 may return the output as a response to a device that sent query 110 to system 100. In some examples, upon a completion of generating dataset 170, processor 120 may remove pair data that have been inserted in local tuple spaces 160, 162, and global tuple space 164. Processor 120 may further clear mappings 158 to remove all mappings among memory 122, local tuple spaces 160, 162, and global tuple space 164.

In another example, a first pair data may be {user1, age1} and a second pair data may be {user1, location1}. System 100 may be implemented to combine the first and second pair data to generate a dataset including {user1, age1, location1}, where "user1" may be a key, and where "age1" and "location1" may each be a value associated with the key "user1". If map module 132a is assigned to process {user1, age1} and map module 132b is assigned to process {user1, location 1}, map module 132a may insert {user1, age1} into local tuple space 160 and map module 132b may insert {user1, location1} into local tuple space 162. During the shuffle phase, processor 120 may insert first pair data {user1, age1} into global tuple space 164. Subsequently, since the key "user1" is already existing in global tuple space 164 (as a result of the insertion), processor 120 may update {user1, age1} to {user1, age1, location1} based on second pair data {user1, location1}. As such, global tuple space 164 may include one piece of key-value data {user1, age1, location1}, instead of two pieces of data such as {user1, age1} and {user1, location1}. As a result, a shuffle module assigned to fetch data associated with key "user1" may perform a fetch operation once as opposed to performing multiple fetch operations and further search in global tuple space 164 may be unnecessary.

Figure 3:
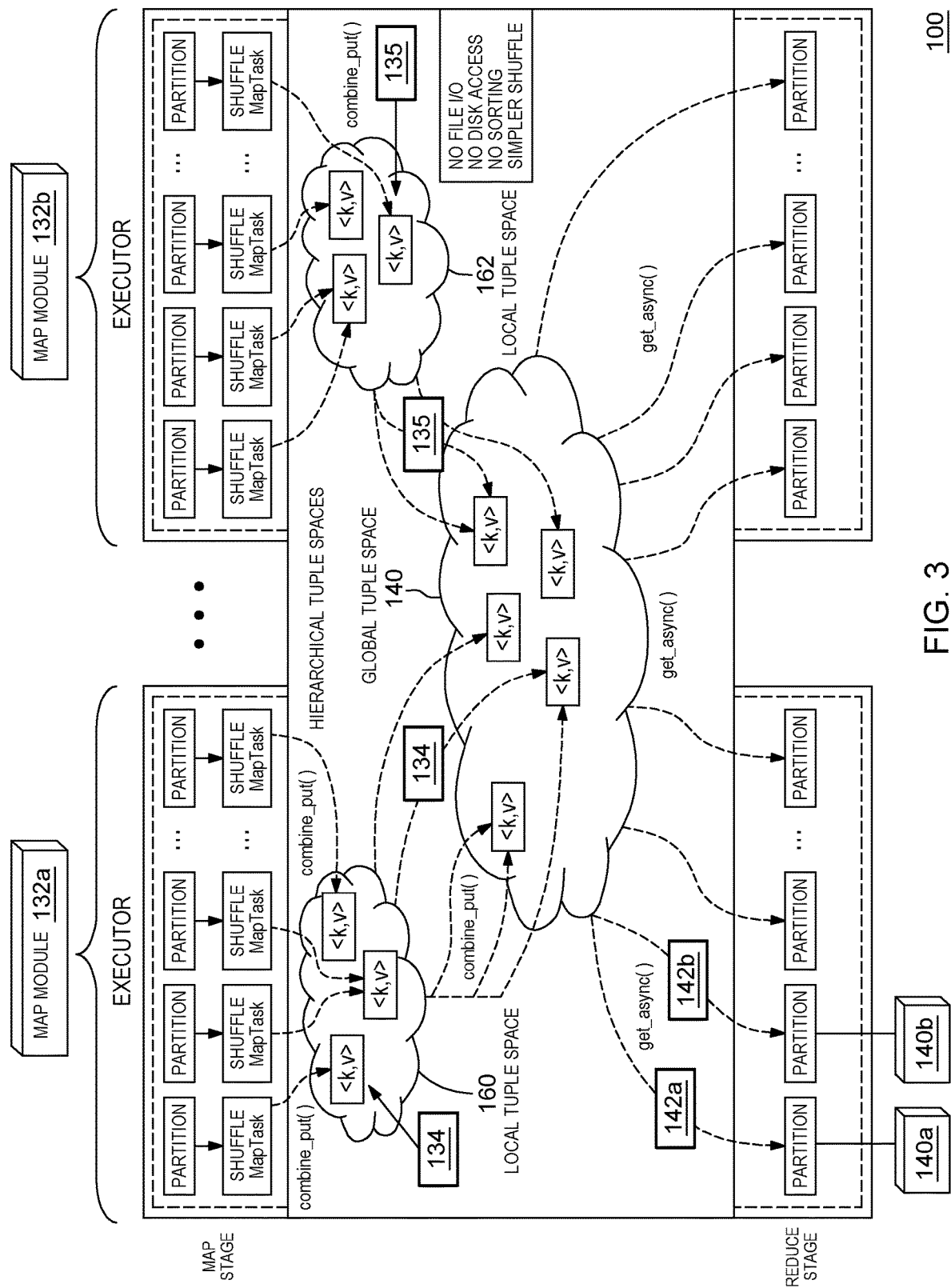
FIG. 3 illustrates the example system of FIG. 1 with additional details relating to data shuffling with hierarchical tuple spaces.

FIG. 3 illustrates the example system of FIG. 1 with additional details relating to data shuffling with hierarchical tuple spaces, arranged in accordance with at least some embodiments described herein. FIG. 3 is substantially similar to computer system 100 of FIG. 1 and FIG. 2, with additional details. Those components in FIG. 3 that are labeled identically to components of FIG. 1 and FIG. 2 will not be described again for the purposes of clarity.

In an example diagram shown in FIG. 3, three processor initiated calls, or instructions, may be executed by system 100—namely "combine_put( )", "get_async( )", and "read_async( )", to implement data shuffling with hierarchical tuple spaces. The call "combine_put( )" may cause key-value pairs of data to be transferred into a local tuple space or into a global tuple space if a key of any key-value pairs are absent from the local tuple space or global tuple space. For example, system 100, or a processor (e.g., processor 120 in FIGS. 1, 2) may execute an operating system to instruct map modules 132a, 132b, to perform the combine_put( ) call to insert and/or update pair data 134, 135 into local tuple spaces 160, 162, respectively. System 100 may instruct map modules 132a, 132b, to perform the combine_put( ) call to insert pair data including missing keys from local tuple spaces 160, 162 to global tuple space 164, or to update pair data including existing keys in global tuple space 164. If a key of the key-value pairs are present in the local tuple space or the global tuple space, the "combine_put( )" call may perform a function (e.g., a function relating to an inquiry to generate a dataset from a set of raw data) to update the existing key-value pairs in the tuple spaces to generate new key-value pairs. In some examples, performing the combine_put( ) call includes updating a corresponding memory location based on the function. For example, if an inquiry is to sum a set of raw data based on keys (e.g., a sum( ) call), performing the combine_put( ) call may include performing the sum( ) call on data that is stored in corresponding memory locations.

The call "get_async( )" may cause system 100 to fetch/remove key-value pairs of data from global tuple space to local tuple space that may be assigned to shuffle modules 140. For example, system 100, or a processor (e.g., processor 120 in FIGS. 1, 2) may execute an operating system to instruct shuffle modules 140a, 140b, to perform the get_async( ) call to fetch pair data 142a, 142b from global tuple space 164, and subsequently, remove pair data 142a, 142b from global tuple space 164. In some examples, keys requested by shuffle modules 140 may need to exist in global tuple space 164 in order for get_async( ) call to be executed successfully. For example, each shuffle module 140 may search for a respective key among global tuple space 164 prior to executing the get_async( ) call, and may fetch pair data from global tuple space 164 if the keys exists in global tuple space 164. In some examples, a blocking call to suspend threads being executed by system 100 may be unnecessary during execution of the get_async( ) call. Since there may be no need to suspend execution of threads, the shuffle phase of the implementation may continue without waiting for the map phase of the implementation to complete.

The call "read_async( )" may fetch/copy key-value pairs of data from global tuple space into local tuple space. For example, system 100, or a processor (e.g., processor 120 in FIGS. 1, 2) may execute an operating system to instruct shuffle modules 140a, 140b, to perform the read_async( ) call to fetch pair data 142a, 142b from global tuple space 164 without removing pair data 142a, 142b from global tuple space 164. In some examples, keys requested by shuffle modules 140 may need to exist in global tuple space 164 in order for read_async ( ) call to be executed successfully. For example, each shuffle module 140 may search for a respective key among global tuple space 164 prior to executing read_async( ) call, and may fetch pair data from global tuple space 164 if the keys exists in global tuple space 164. In some examples, a blocking call to suspend threads being executed by system 100 may be unnecessary during execution of the read_async( ) call. Since there may be no need to suspend execution of threads, the shuffle phase of the implementation may continue without waiting for the map phase of the implementation to complete.

In summary, key-value pairs may be transferred from local tuple spaces to global tuple space after the map stage (e.g., generation of pair data). Local key-value pairs stored in local tuple space may be exposed to the global tuple space, without an actual data transfer. Further, key-value pairs may be dynamically updated such that network traffic may be reduced due to the reduced pieces of data being transferred at the reduce stage. Still further, shuffle modules may begin fetching key-value pairs from the global tuple space without waiting for the entire map stage to complete.

A system in accordance with the present disclosure may facilitate an improvement in data shuffle mechanisms by establishing an in-memory hierarchical tuple spaces for key-value pairs as generated from the mappers. The tuple spaces may be hierarchical with local and global spaces, and mappers may transfer local key-value pairs from local to the global tuple space. Reducers may fetch key-value pairs from the global tuple space, and the transfer action may be triggered by the fetch request from reducers. As a result, disk I/O overhead may be prevented by utilizing hierarchical in-memory tuple spaces as described above. Further, a system in accordance with the present disclosure may intercept a shuffle write process to avoid file generation for key-value pairs, and may collect all generated key-value pairs inside a local tuple space. Each local tuple space corresponding to a physical computing node may gather key-value pairs from all executors/threads inside the physical computing node. Each key may be appended with a specific executor/partition meta data such that a global key may be generated and data locality may be improved.

In conventional data shuffling schemes, all-to-all communication may be required and thus, may incur major performance cost, may be complex, and may cause problems such as bandwidth and latency issues. Further, typical data shuffling techniques may depend on filesystem and may include I/O limitations. Many current shuffle implementations may store data in blocks on local or distributed disk I/O for data shuffling, which may cause major overhead on an operating system, and both the source and the destination side may require many file and network I/O operations. Some existing data aggregation techniques used for filesystem and communication optimization may add extra computation overheads. For example, techniques that merges files into buckets then reduce the total number of files may use many files, or techniques that utilize sort-based shuffle such that each mapping task may generate one shuffle data file and one index file, may use file I/O operations to store and manage shuffle files.

A system in accordance with the present disclosure may be used to avoid dependency on files for distributed data representation, and eliminate filesystem or disk I/O operations and extra computation to prepare data partitions in the shuffle write stage. A burden on the operating system for managing filesystem and I/O operations may also be mitigated. By eliminating the dependency on the filesystem, a system in accordance with the present disclosure may be used to establish a more efficient full in-memory shuffle mechanism.

By inserting key-value pairs of missing keys and updating key-value pairs of existing keys, a system in accordance with the present disclosure may execute calls to overlap map and shuffle stages such that network traffic may be reduced, partly due to transferring combined key-value pairs may utilize less bandwidth than transferring raw key-value pairs prior to aggregation. As a result, the system may provide hot spot contention with asynchronous and efficient communication schemes. By establishing an active insertion operation that dynamically updating existing key-value pairs with a matching input key-value pair using a generic function, key-value pairs from the global tuple space may be fetched asynchronously to improve an efficiency of the system.

Figure 4:
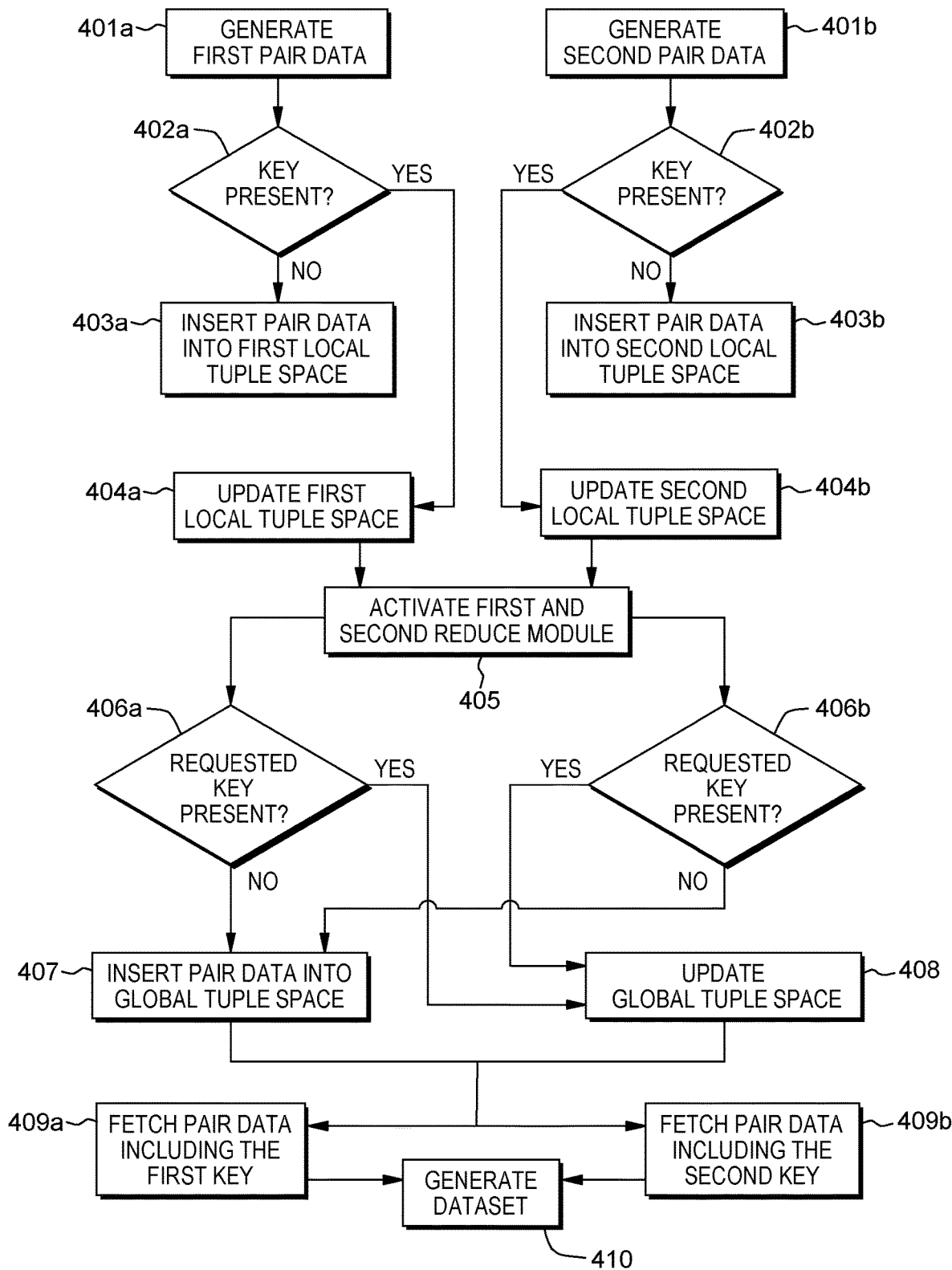
FIG. 4 illustrates a flow diagram for an example process to implement data shuffling with hierarchical tuple spaces.

FIG. 4 illustrates a flow diagram for an example process to implement data shuffling with hierarchical tuple spaces, arranged in accordance with at least some embodiments presented herein. The process in FIG. 4 could be implemented using, for example, computer system 100 discussed above. An example process may include one or more operations, actions, or functions as illustrated by one or more of blocks 401, 402, 403, 404, 405, 406, 407, 408, 409, and/or 410. Although illustrated as discrete blocks, various blocks may be divided into additional blocks, combined into fewer blocks, eliminated, or performed in parallel, depending on the desired implementation.

Processing may begin at blocks 401 (including blocks 401a, 401b), where a first map module of a processor may generate first pair data from source data, and a second map module of the processor may generate second pair data from the source data. In some examples, generation of the first pair data and the second pair data may be performed in parallel. Each pair data may include a set of key-value pairs, and each key-value pair may include a key and one or more values associated with the key. For example, a key may be a word, and a value of the key may be a number of occurrences of the word. In another example, a key may be an identification of a person (e.g., name, ID number, etc.) and one or more values associated with the person may be an age, an address, an occupation, education background, hobbies, etc.

Processing may continue from blocks 401 to blocks 402 (including blocks 402a, 402b), each of the first and second map modules may determine a presence of keys in local tuple spaces respectively assigned to each map module. For example, the first map module may determine if each key among the generated first pair data is present or absent in a first local tuple space assigned to the first map module. Similarly, the second map module may determine if each key among the generated second pair data is present or absent in a second local tuple space assigned to the second map module. The first local tuple space may be accessible to the first map module and may be inaccessible to the second map module. The second local tuple space may be accessible to the second map module and may be inaccessible to the first map module.

In response to an absence of one or more key among first and second pair data, processing may continue from blocks 402 to 403 (including blocks 403a, 403b). At blocks 403, the first map module may insert pair data including the missing keys among the first pair data into the first local tuple space, and the second map module may insert pair data including the missing keys among the second pair data into the second local tuple space.

In response to a presence of one or more key among first and second pair data, processing may continue from blocks 402 to 404 (including blocks 404a, 404b). At blocks 404, the first map module may update pair data in the first local tuple space that include existing keys among the first pair data, and the second map module may update pair data in the second local tuple space that include existing keys among the second pair data.

At blocks 405, the processor may activate a first shuffle module and a second shuffle module to perform shuffle operations, where shuffle operations may include aggregation of pair data based on a same key. Upon the activation, the first shuffle module of the processor may request pair data including a first key and the second shuffle module of the processor may request pair data including a second key.

At blocks 406 (including blocks 406a, 406b), in response to the requests from blocks 403, each of the first and second map modules may determine a presence of requested keys in a global tuple space accessible to both the first and second map modules and to both the first and second shuffle modules. For example, the first map module may determine if the requested first key is present or absent in a first local tuple space assigned to the first map module. Similarly, the second map module may determine if the requested second key is present or absent in a second local tuple space assigned to the second map module.

In response to an absence of the requested keys, processing may continue from blocks 406 to block 407. At block 407, the first map module may insert a piece of pair data including the missing first key among the first local tuple space into the global tuple space, and the second map module may insert a piece of pair data including the missing second key from the second local tuple space into the global tuple space.

In response to a presence of the requested keys, processing may continue from blocks 406 to 408. At block 408, the first map module may update pair data in the global tuple space that includes the existing first key, and the second map module may update pair data in the global tuple space that includes the existing second key.

Processing may continue to from block 407 and/or block 408 to blocks 409 (including blocks 409a, 409b), where the first shuffle module may fetch a piece of pair data including the first key from the global tuple space, and the second shuffle module may fetch a piece of pair data including the second key from the global tuple space. In some examples, the first shuffle module and the second shuffle module may perform a search for each respective requested key prior to performing a fetch operation. If a requested key exists in the global tuple space, then the fetch operations may be performed.

Processing may continue from blocks 409 to block 410, where the processor may generate a dataset based on the pair data fetched from the first and second shuffle modules. The generated dataset may include one or more key-value pairs, where each key-value pair may include a key and one or more aggregated values associated with the key. In some examples, generation of the dataset may include execution of a shuffle operation, by each shuffle module, on respective fetched pair data. For example, the first shuffle module may execute a shuffle operation on the first fetched pair data including the first key, and the second shuffle module may execute the shuffle operation on the second fetched pair data including the second key. The processor may receive the outputs generated by each shuffle module and may combine the outputs to form the dataset.

Figure 5:
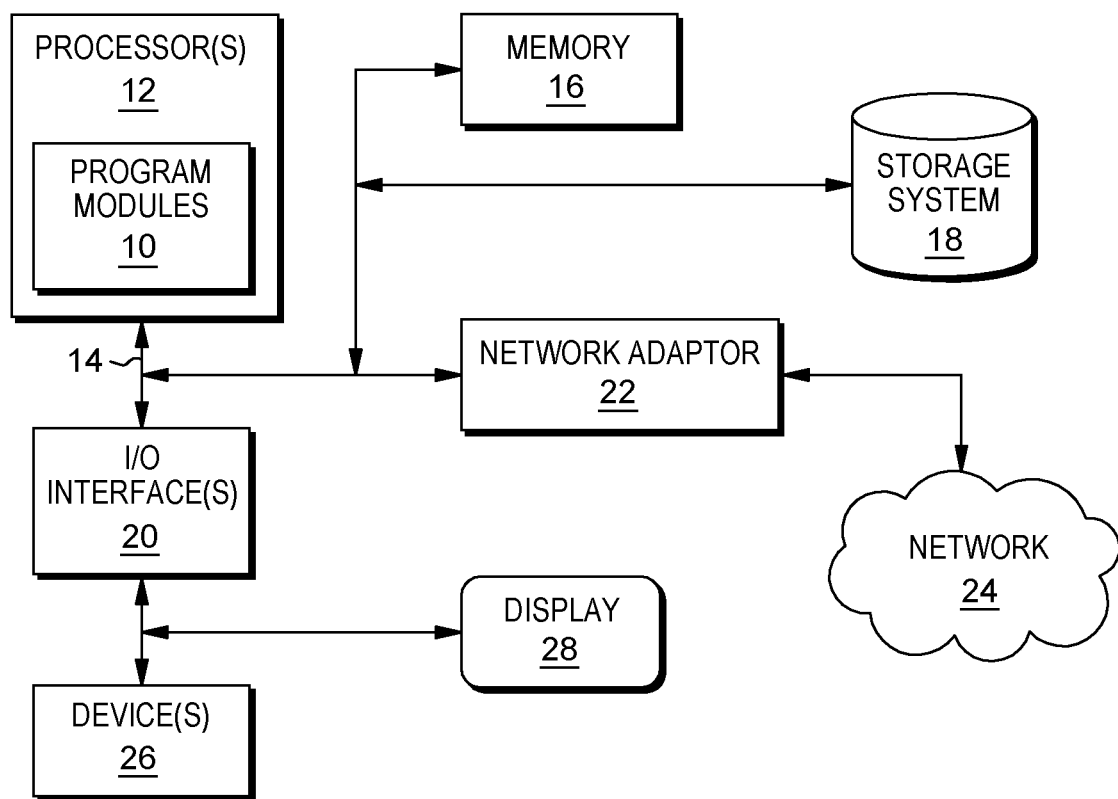
FIG. 5 is an exemplary block diagram of a computer system in which processes involved in the system, method, and computer program product described herein may be implemented.

FIG. 5 illustrates a schematic of an example computer or processing system that may implement any portion of computer system 100, processor 120, memory 122, map modules 132, shuffle modules 140, systems, methods, and computer program products described herein in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computer system environments or configurations. Examples of well-known computer systems, environments, and/or configurations that may be suitable for use with the processing system may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a software module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for shuffling source data to generate a dataset, the method comprising:

generating, by a first map module of a processor, first pair data from the source data;

generating, by a second map module of the processor, second pair data from the source data, wherein each pair data among the first pair data and the second pair data includes a key and a value associated with the key;

inserting, by the first map module of the processor, a first portion of the first pair data into a first local tuple space accessible by the first map module, wherein the inserted first portion of the first pair data includes keys that are absent from the first local tuple space prior to the insertion of the first portion of the first pair data;

updating, by the first map module of the processor, the first local tuple space based on a second portion of the first pair data, wherein the second portion of the first pair data includes keys that are present in the first local tuple space prior to the update of the first local tuple space;

inserting, by the second map module of the processor, a first portion of the second pair data into a second local tuple space accessible by the second map module, wherein the inserted first portion of the second pair data includes keys that are absent from the second local tuple space prior to the insertion of the first portion of the second pair data;

updating, by the second map module of the processor, the second local tuple space based on a second portion of the second pair data, wherein the second portion of the second pair data includes keys that are present in the second local tuple space prior to the update of the second local tuple space;

activating, by the processor, a shuffle module of the processor to execute a shuffle operation on pair data that includes a particular key;

in response to the activation of the shuffle module to execute the shuffle operation on pair data that includes the particular key:

determining, by the processor, a presence of one or more keys in a global tuple space accessible by the first map module and the second map module;

in response to a presence of an existing key in the global tuple space, updating, by the processor, pair data in the global tuple space that includes the existing key, wherein the update is based on pair data among the first and second local tuple spaces that includes the existing key;

in response to an absence of a missing key in the global tuple space, inserting, by the processor, pair data including the missing key among the first and second local tuple spaces into the global tuple space;

identifying, by the shuffle module of the processor, pair data in the global tuple space that includes the particular key;

fetching, by the shuffle module of the processor, the identified pair data from a memory, wherein the fetched pair data includes the particular key and one or more values associated with the particular key; and executing, by the shuffle module of the processor, the shuffle operation on the fetched pair data to generate the dataset.

2. The method of claim 1, wherein prior to generating the first pair data and the second pair data, the method further comprising:

partitioning, by the processor, the source data into at least a first partition and a second partition;

assigning, by the processor, the first map module to generate the first pair data based on the first partition; and assigning, by the processor, the second map module to generate the second pair data based on the second partition.

3. The method of claim 1, wherein prior to fetching the pair data, the method further comprising:

storing, by the processor, the first pair data in the memory at a first set of memory addresses; and storing, by the processor, the second pair data in the memory at a second set of memory addresses.

4. The method of claim 3, wherein identifying the pair data including the particular key includes identifying, by the processor, a memory address storing the pair data including the particular key based on mappings of the first set of memory addresses and the second set of memory addresses to the global tuple space.

5. The method of claim 1, wherein:

the shuffle module is a first shuffle module of the processor, the particular key is a first particular key, and the method further comprising:

activating, by the processor, a second shuffle module of the processor to execute the shuffle operation on pair data that includes a second particular key;

identifying, by the second shuffle module of the processor, pair data including the second particular key in the global tuple space;

fetching, by the second shuffle module of the processor, the pair data including the second particular key from the memory; and executing, by the second shuffle module of the processor, the shuffle operation on the fetched pair data that includes the second particular key to generate the dataset such that the dataset includes pair data that includes the first particular key and pair data that includes the second particular key.

6. The method of claim 1, wherein the first local tuple space is inaccessible by the second map module, and the second local tuple space is inaccessible by the first map module.

7. The method of claim 1, further comprising, in response to generation of the dataset:

removing, by the processor, the first set of pair data from the first local tuple space;

removing, by the processor, the second set of pair data from the second local tuple space; and removing, by the processor, the first set of pair data and the second set of pair data from the global tuple space.

8. The method of claim 1, wherein updating the pair data in the global tuple space includes:

identifying, by the processor, particular pair data in the global tuple space that includes the existing key; and updating, by the processor, the particular pair data in the global tuple space based on one or more values of pair data among the first and second local tuple spaces that includes the existing key.

9. The method of claim 1, wherein:

updating the first local tuple space includes:

identifying, by the first map module of the processor, first particular pair data in the first local tuple space that includes a first set of existing keys; and updating, by the first module of the processor, the first particular pair data in the first local tuple space based on one or more values of the second portion of the first pair data that includes the first set of existing keys;

updating the second local tuple space includes:

identifying, by the second map module of the processor, second particular pair data in the second local tuple space that includes a second set of existing keys; and updating, by the second map module of the processor, the second particular pair data in the second local tuple space based on one or more values of the second portion of the second pair data that includes the second set of existing keys.

10. A system effective to shuffle source data to generate a dataset, the system comprising:

a memory configured to store the source data;

a processor configured to be in communication with the memory;

at least a first map module and a second map module configured to be in communication with the memory and the processor;
at least a shuffle module configured to be in communication with the memory and the processor;
the first map module is configured to:
   generate first pair data from the source data;
   insert a first portion of the first pair data into a first local tuple space accessible by the first map module, wherein the inserted first portion of the first pair data includes keys that are absent from the first local tuple space prior to the insertion of the first portion of the first pair data;
   update the first local tuple space based on a second portion of the first pair data, wherein the second portion of the first pair data includes keys that are present in the first local tuple space prior to the update of the first local tuple space; the second map module is configured to:
   generate second pair data from the source data;
   insert a first portion of the second pair data into a second local tuple space accessible by the second map module, wherein the inserted first portion of the second pair data includes keys that are absent from the second local tuple space prior to the insertion of the first portion of the second pair data;
   update the second local tuple space based on a second portion of the second pair data, wherein the second portion of the second pair data includes keys that are present in the second local tuple space prior to the update of the second local tuple space;
   the processor is configured to:
      activate the shuffle module of the processor to execute a shuffle operation on pair data that includes a particular key;
      in response to the activation of the shuffle module to execute the shuffle operation on pair data that includes the particular key:
      determine a presence of one or more keys in a global tuple space accessible by the first map module and the second map module;
      in response to a presence of an existing key in the global tuple space, update pair data in the global tuple space that includes the existing key, wherein the update is based on pair data among the first and second local tuple space that includes the existing key, and
      in response to an absence of a missing key in the global tuple space, insert pair data including the missing key among the first and second local tuple space into the global tuple space;
   the shuffle module is further configured to:
      identify a pair data in the global tuple space that includes the particular key;
      fetch the identified pair data from a memory, wherein the fetched pair data includes the particular key and one or more values associated with the particular key; and
      execute the shuffle operation on the fetched pair data to generate the dataset.

11. The system of claim 10, wherein the processor is further configured to, prior to generating the first pair data and the second pair data:
   partition the source data into at least a first partition and a second partition;
   assign the first map module to generate the first pair data based on the first partition; and
   assign the second map module to generate the second pair data based on the second partition.

12. The system of claim 10, wherein the processor is further configured to:
   store the first pair data in the memory at a first set of memory addresses; and
   store the second pair data in the memory at a second set of memory addresses.

13. The system of claim 12, wherein the shuffle module is further configured to identify a memory address storing the pair data that includes the particular key based on mappings of the first set of memory addresses and the second set of memory addresses to the global tuple space.

14. The system of claim 10, wherein:
   the shuffle module is a first shuffle module;
   the particular key is a first particular key, and the processor is further configured to activate a second shuffle module to execute the shuffle operation on pair data that includes a second particular key;
   the second shuffle module is configured to:
      identify a pair data including the second particular key in the global tuple space; and
      fetch the pair data including the second particular key from the global tuple space; and
      execute the shuffle operation on the fetched pair data that includes the second particular key to generate the dataset such that the dataset includes pair data that includes the first particular key and pair data that includes the second particular key.

15. The system of claim 10, wherein the first local tuple space is inaccessible by the second map module, and the second local tuple space is inaccessible by the first map module.

16. The system of claim 10, wherein the processor is further configured to:
   remove the first set of pair data from the first local tuple space;
   remove the second set of pair data from the second local tuple space; and
   remove the first set of pair data and the second set of pair data from the global tuple space.

17. The system of claim 10, wherein the processor is further configured to:
   identify particular pair data in the global tuple space that includes the existing key; and
   update the particular pair data in the global tuple space based on one or more values of pair data among the first and second local tuple spaces that includes the existing key.

18. A computer program product for shuffling source data to generate a dataset, the computer program product comprising a computer readable storage medium having program instructions embodied therewith, the program instructions executable by a device to cause the device to:
   generate first pair data from the source data;
   generate second pair data from the source data, wherein each pair data among the first pair data and the second pair data includes a key and a value associated with the key;
   insert a first portion of the first pair data into a first local tuple space accessible by a first map module, wherein the inserted first portion of the first pair data includes keys that are absent from the first local tuple space prior to the insertion of the first portion of the first pair data;

update the first local tuple space based on a second portion of the first pair data, wherein the second portion of the first pair data includes keys that are present in the first local tuple space prior to the update of the first local tuple space;

insert a first portion of the second pair data into a second local tuple space accessible by a second map module, wherein the inserted first portion of the second pair data includes keys that are absent from the second local tuple space prior to the insertion of the first portion of the second pair data;

update the second local tuple space based on a second portion of the second pair data, wherein the second portion of the second pair data includes keys that are present in the second local tuple space prior to the update of the second local tuple space;

activate a shuffle phase indicated by the program instructions to execute a shuffle operation on pair data that includes a particular key;

in response to the activation of the shuffle phase to execute the shuffle operation on pair data that includes the particular key:

determine a presence of one or more keys in a global tuple space accessible by the first map module and the second map module;

in response to a presence of an existing key in the global tuple space, update pair data in the global tuple space that includes the existing key, wherein the update is based on pair data among the first and second local tuple space that includes the existing key, and in response to an absence of a missing key in the global tuple space, insert pair data including the missing key among the first and second local tuple space into the global tuple space;

identify pair data in the global tuple space that includes the particular key;

fetch the identified pair data from a memory, wherein the fetched pair data includes the particular key and one or more values associated with the particular key; and execute the shuffle operation on the fetched pair data to generate the dataset.

19. The computer program product of claim 18, wherein the first local tuple space is inaccessible by the second map module, and the second local tuple space is inaccessible by the first map module.

20. The computer program product of claim 18, wherein the program instructions are further executable by the device to cause the device to:

partition the source data into at least a first partition and a second partition;

assign the first map module to generate the first pair data based on the first partition; and assign the second map module to generate the second pair data based on the second partition.

* * * * *